Patented May 16, 1933

1,909,693

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE DIBENZANTHRONE SERIES

No Drawing. Application filed December 21, 1929, Serial No. 415,785, and in Germany April 8, 1927.

The present invention relates to the production of new vat dyestuffs.

We have found that new valuable dyestuffs are obtained by condensing a pyranthrone containing at least three negative substituents, such as halogen atoms or nitro groups, with such amounts of a dibenzanthrone containing at least one nitrogen atom having a reactive hydrogen atom attached thereto, as to replace at least two, but not all of the negative substituents of the pyranthrone by the dibenzanthrone-imino radicle. Suitable nitrogenous dibenzanthrones are the aminodibenzanthrone or its derivatives or homologues in which one hydrogen atom of the amino group may be replaced by a low alkyl radicle, such as a methyl, ethyl or propyl group.

The new dyestuffs probably correspond to the general formula

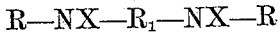

in which R indicates a dibenzanthrone radicle, $R_1$ indicates a pyranthrone radicle containing at least one negative substituent and which may contain further substituents of the type R—NX—, and X means hydrogen or a low alkyl group. The reaction products dissolve in concentrated sulphuric acid usually to give violet solutions and dye the vegetable fiber from blue vats grey to black shades of excellent fastness.

The condensation is preferably carried out in organic solvents or diluting media of high boiling point, such as nitrobenzene, naphthalene or quinoline, and preferably with an addition of acid fixing agents, for example, the alkali metal salts of weak acids, such as sodium acetate, or the oxides of the alkaline earth metals, and of catalysts, such as copper and its compounds.

In the condensation process according to the present invention nitro compounds of dibenzanthrones may be used as the nitrogenous component, if a reducing agent, such as hydrazine hydrate or sulphur or the like, is added to the reaction mixture.

The following examples will further illustrate how the present invention may be carried out in practice, but the invention is not limited to these examples. The parts are by weight.

Example 1

72 parts of tetrabrompyranthrone, obtainable by brominating pyranthrone in chlorosulphonic acid, are boiled in 2000 parts of nitrobenzene with 141 parts of pure aminodibenzanthrone, 50 parts of sodium acetate and 12 parts of copper oxide while stirring, until unaltered aminodibenzanthrone can no longer be detected. The reaction mass may be worked up by filtration by suction or by distilling off the solvent, if desired with the aid of reduced pressure or of steam or of both. The resulting dyestuff probably corresponding to the formula

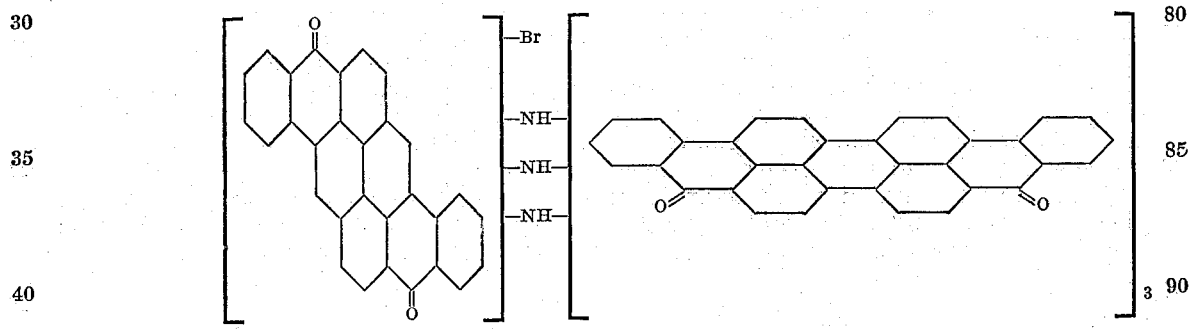

is a black powder dissolving in concentrated sulphuric acid with a reddish violet coloration and dyes the vegetable fiber from a greenish blue vat grey to black shades of excellent fastness and in particular fastness to bucking.

Example 2

44 parts of hexabrompyranthrone, obtainable by brominating pyranthrone in fuming sulphuric acid, are boiled in 2000 parts of nitrobenzene with an addition of 50 parts of sodium acetate, 12 parts of copper oxide and 94 parts of pure aminodibenzanthrone while stirring, until all aminodibenzanthrone has entered into reaction. The mass is worked up in the manner described in Example 1. The resulting dyestuff which probably corresponds to the formula

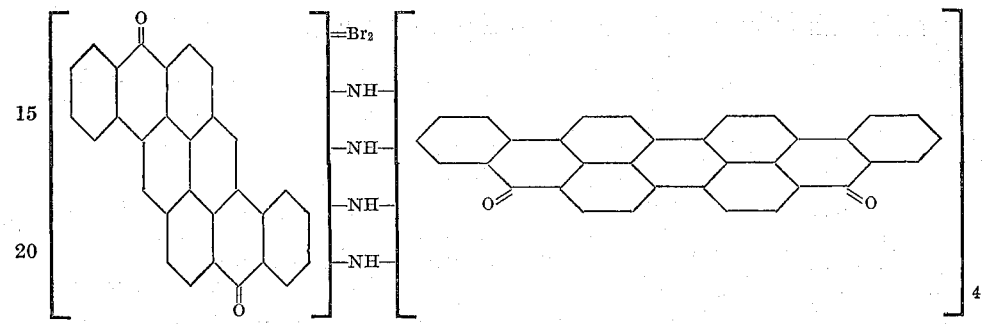

is a black powder dissolving in concentrated sulphuric acid with a reddish violet coloration and dyes the vegetable fiber from a blue vat grey to black shades of excellent fastness.

*Example 3*

31.5 parts of dichlordibrompyranthrone,

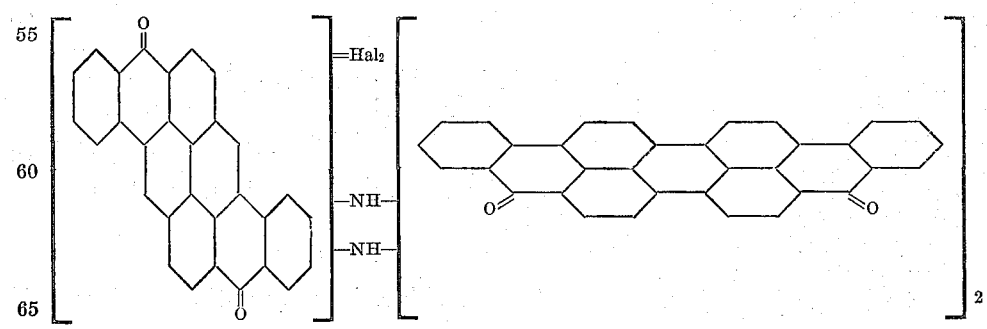

obtainable by brominating dichlorpyranthrone in chlorosulphonic acid, are boiled in 1250 parts of nitrobenzene with 25 parts of sodium acetate, 7 parts of copper oxide and 47 parts of aminodibenzanthrone while stirring, until unaltered aminodibenzanthrone can no longer be detected, whereupon the reaction mass is worked up in the usual manner. The resulting dyestuff, of which an excellent yield is obtained and which probably corresponds to the formula dissolves in concentrated sulphuric acid with the formation of a violet solution and dyes cotton from a blue vat grey shades with a violet tinge.

*Example 4*

6 parts of dibrom-mononitro-pyranthrone, obtainable by nitrating dibrompyranthrone in highly concentrated nitric acid, are boiled in 250 parts of nitrobenzene with 5 parts of

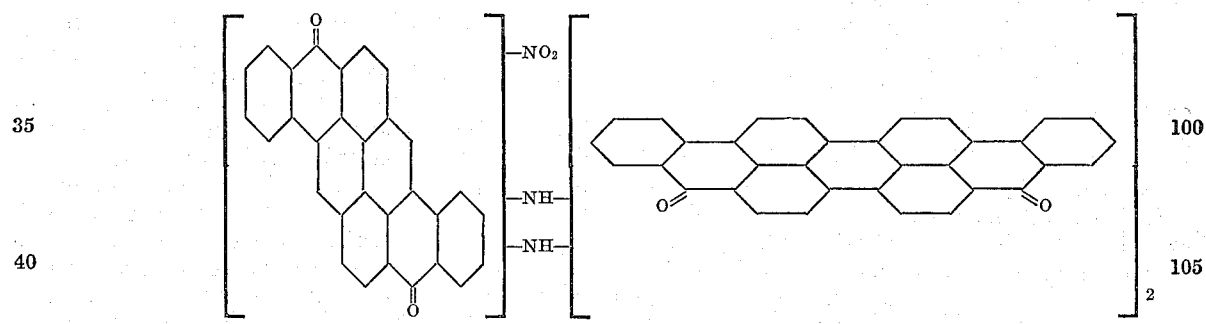

sodium acetate, 2 parts of copper oxide and 9.4 parts of aminodibenzanthrone while stirring, until all aminodibenzanthrone has entered into reaction. The mass is worked up in the usual manner. The dyestuff obtained which probably corresponds to the following formula dissolves in concentrated sulphuric acid giving a solution with a violet coloration and dyes cotton from a blue vat greenish grey shades of excellent fastness.

This application is a continuation in part of our copending application Ser. No. 267,478, filed April 4th, 1928.

What we claim is:

1. The process of producing vat dyestuffs which comprises condensing a pyranthrone containing at least three substituents selected from the group consisting of halogen and the nitro group with such amounts of a dibenzanthrone containing at least one nitrogen atom having a reactive hydrogen atom attached thereto, as to replace at least two, but not all, of the substituents selected from the group consisting of halogen and the nitro group contained in the pyranthrone by dibenzanthrone-imino radicles.

2. The process of producing vat dyestuffs which comprises condensing a pyranthrone containing at least three substituents selected from the group consisting of halogen and the nitro group with such amounts of a dibenzanthrone containing at least one nitrogen atom having a reactive hydrogen atom attached thereto, as to replace at least two, but not all, of the substituents selected from the group consisting of halogen and the nitro group contained in the pyranthrone by dibenzanthrone-imino radicles, in the presence of an inert organic diluent of high boiling point.

3. The process of producing vat dyestuffs which comprises condensing a pyranthrone containing at least three substituents selected from the group consisting of halogen and the nitro group with such amounts of a dibenzanthrone containing at least one nitrogen atom having a reactive hydrogen atom attached thereto, as to replace at least two, but not all, of the substituents selected from the group consisting of halogen and the nitro group contained in the pyranthrone by dibenzanthrone-imino radicles, in the presence of an acid-fixing agent.

4. The process of producing vat dyestuffs which comprises condensing a pyranthrone containing at least three substituents selected from the group consisting of halogen and the nitro group with such amounts of a dibenzanthrone containing at least one nitrogen atom having a reactive hydrogen atom attached thereto, as to replace at least two, but not all, of the substituents selected from the group consisting of halogen and the nitro group contained in the pyranthrone by dibenzanthrone-imino radicles, in the presence of a copper compound.

5. The vat dyestuffs which dissolve in concentrated sulphuric acid giving violet solutions, which dye cotton grey to black shades from blue vats and which correspond to general formula $$R-NX-R_1-NX-R$$

in which R indicates a dibenzanthrone radicle, $R_1$ indicates a pyranthrone radicle containing at least one substituent selected from the group consisting of halogen and the nitro group, and X means hydrogen or a low alkyl group.

6. The vat dyestuffs which dissolve in concentrated sulphuric acid giving violet solutions, which dye cotton grey to black shades from blue vats and which correspond to the general formula $$R-NX-R_1-NX-R$$

in which R indicates a dibenzanthrone radicle, $R_1$ indicates a pyranthrone radicle containing at least one substituent selected from the group consisting of halogen and the nitro group and containing at least one further substituent of the type $R-NX-$, and X indicates hydrogen or a low alkyl group.

7. The vat dyestuff probably corresponding to the formula

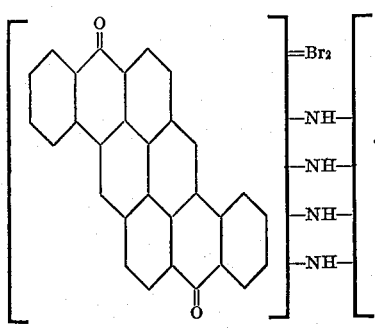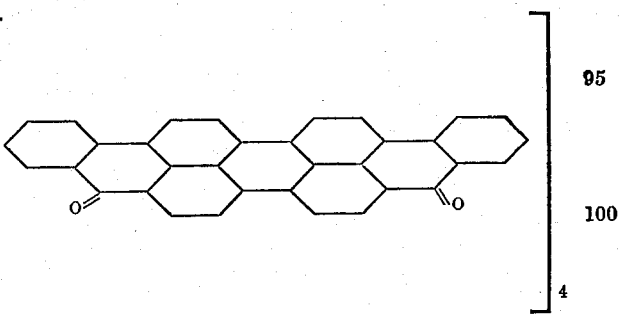

which dyes the vegetable fiber from a blue vat grey to black shades and which dissolves in concentrated sulphuric acid with a reddish violet coloration.

In testimony whereof we have hereunto set our hands.

MAX ALBERT KUNZ.
KARL KOEBERLE.